United States Patent [19]
Griesmer et al.

[11] Patent Number: 5,649,109
[45] Date of Patent: Jul. 15, 1997

[54] APPARATUS AND METHOD FOR MAINTAINING FORWARDING INFORMATION IN A BRIDGE OR ROUTER USING MULTIPLE FREE QUEUES HAVING ASSOCIATED FREE SPACE SIZES

[75] Inventors: Martin Edward Griesmer, Arlington; Parayath Gopal Krishnakumar, West Newton; David Benson, Acton, all of Mass.

[73] Assignee: Digital Equipment Corporation, Maynard, Mass.

[21] Appl. No.: 965,121

[22] Filed: Oct. 22, 1992

[51] Int. Cl.⁶ .................................................. G06F 15/16
[52] U.S. Cl. ..................... 395/200.17; 395/200.01; 370/241
[58] Field of Search .......................... 395/250, 200, 395/200.17, 200.01; 370/95.13

[56] References Cited

U.S. PATENT DOCUMENTS

| | | | |
|---|---|---|---|
| 4,074,254 | 2/1978 | Belser et al. | 340/324 |
| 4,587,610 | 5/1986 | Rodman | 364/200 |
| 4,627,052 | 12/1986 | Hoare et al. | 370/85.13 |
| 4,677,550 | 6/1987 | Ferguson | 364/300 |
| 4,680,700 | 7/1987 | Hester | 364/200 |
| 4,695,949 | 9/1987 | Thatte et al. | 364/200 |
| 4,715,030 | 12/1987 | Koch et al. | 370/85.13 |
| 4,737,953 | 4/1988 | Koch et al. | 370/85.13 |
| 4,780,816 | 10/1988 | Connell | 364/200 |
| 4,922,417 | 5/1990 | Churm et al. | 364/200 |
| 4,933,937 | 6/1990 | Konishi | 370/85.13 |
| 5,027,350 | 6/1991 | Marshall | 370/85.13 |
| 5,032,987 | 7/1991 | Broder et al. | 364/200 |
| 5,095,480 | 3/1992 | Fenner | 370/94.1 |
| 5,109,336 | 4/1992 | Geunther et al. | 395/425 |
| 5,121,495 | 6/1992 | Nemes | 395/600 |
| 5,136,580 | 8/1992 | Videlock et al. | 370/60 |
| 5,197,002 | 3/1993 | Spencer | 364/406 |
| 5,301,273 | 4/1994 | Konishi | 395/200 |
| 5,303,302 | 4/1994 | Burrows | 380/49 |
| 5,432,907 | 7/1995 | Picazo, Jr. et al. | 395/200.1 |

OTHER PUBLICATIONS

Concepts in data structures and software development by Schneider et al., West publishing company, pp. 134–135, 141–144.

The C programming language by Kernishan et al., Prentice Hall publication, pp. 185–189.

System Software by Beck, Addison–Wesley publishing company, pp. 339–340.

1983, Reingold, E.M. & Hansen, W.J., *Data Structures*, pp. 123–155 and pp. 246–270, Little, Brown Computer Systems Series.

*Primary Examiner*—Parshotam S. Lall
*Assistant Examiner*—Zarni Maung
*Attorney, Agent, or Firm*—David A. Dagg; Gary E. Ross; Arthur W. Fisher

[57] ABSTRACT

A forwarding information management system for a bridge or router is disclosed, including a method and apparatus for maintaining forwarding entries within a forwarding table. The forwarding table is allocated into forwarding entries, and the forwarding entries organized into forwarding entry sets. A set of free queues is used to manage the free space segments in the forwarding table that are not allocated into forwarding entries. Each free queue maintains pointers to free space segments of a particular size. A forwarding entry adding process creates a new forwarding entry set including a new forwarding entry, selects a non-empty free queue for free space segments large enough to hold the new forwarding entry set, and writes the new forwarding entry set one of the free space segments. Also included in the system are a forwarding entry deleting process, a learning process providing input for the forwarding entry adding process, and an aging process providing input for the forwarding entry deleting process. In an example embodiment, a hash table is used to locate the forwarding entry sets in the forwarding table. In a preferred embodiment, forwarding entries within the forwarding entry sets are organized into balanced binary trees.

11 Claims, 11 Drawing Sheets

| 42 | 43 | 44 | 45 | 46 | 47 | 48 | 49 | 50 |

FIG. 2

APPARATUS AND METHOD FOR MAINTAINING FORWARDING INFORMATION IN A BRIDGE OR ROUTER USING MULTIPLE FREE QUEUES HAVING ASSOCIATED FREE SPACE SIZES

FIELD OF THE INVENTION

The invention relates generally to database management, and more particularly to management of frame forwarding information in bridges and routers.

BACKGROUND

In communications systems, Local Area Networks (LANs) provide communication between a limited number of stations located within a limited geography. A single LAN is known as a LAN segment, and a group of LANs joined together by one or more bridges or routers is known as an extended LAN. A typical LAN segment may connect hundreds of stations over a distance of several kilometers. A bridge or router may be used to connect multiple LAN segments, providing communication between a larger number of stations over a larger area, and preventing excessive local traffic from degrading overall network performance.

The bridge or router monitors the traffic on all the LAN segments to which it is attached, and determines a destination segment (or segments) for each particular frame. To make this determination, the addressing information in the frame is used to locate forwarding information in a forwarding database.

The forwarding information for a specific address is contained in the forwarding entry for that address. Each forwarding entry contains an address field and a forwarding information field. The forwarding information field contains forwarding information for frames containing the address found in the address field.

Add entry and delete entry operations are performed to update the forwarding database as stations are added to and removed from the LAN segments attached to the bridge or router. In many cases, the system manager requests add or delete entry operations through the user interface to the bridge or router.

Add entry operations may also be automatically issued by a learning process within the bridge or router. For example, when a frame is received on LAN segment S, having a station address A in its source address field, and there is no existing forwarding entry with address field equal to A in the forwarding database, a new forwarding entry is added to the forwarding database. The new forwarding entry has an address field equal to A, and forwarding information field indicating that frames received with destination address equal to A should be forwarded onto segment S. In this way, forwarding entries for new stations on the network are added without system manager intervention.

Forwarding entries may also be automatically deleted by an entry aging process within the bridge or router. For example, when a predetermined time period passes where no frame is received with source address equal to A, the aging process may delete the forwarding entry with address field equal to A. In this way, forwarding entries for stations that have been removed from the network are deleted without system manager intervention.

In known bridges, add entry and delete entry operations maintain the forwarding database as an ordered list, sorted on the basis of the address field of the forwarding entries. In these implementations, add entry operations include the steps of:

1) using binary search to find the position within the list for the new entry;

2) moving as many as all the current entries to open up the position for the new entry; and 3) writing the new entry into the ordered list.

A significant drawback in ordered list implementations is that during step 2, a significant amount of processing resources are required to move the existing forwarding entries to accommodate the new entry. In many implementations, the processing resources are shared by multiple processes within the bridge or router. In these implementations, where there is a large forwarding database and frequent add entry operations, this may cause unacceptable performance degradation of processes other than the process performing the add entry operations.

Similarly, in known bridges and routers where the forwarding database is maintained as an ordered list, delete entry operations require significant processing resources to fill in the space created by the deletion. Again, in a worst case, as many as all the remaining forwarding entries in the forwarding table were moved.

A limited improvement is obtainable by making a working copy of the forwarding database before each add entry or delete entry operation, and performing the add entry or delete entry operation on the working copy. The modified working copy is then written over the old forwarding database. Thus, the time the forwarding database is in transition is the time required to write back the working copy. A significant drawback of this approach is that it requires sufficient memory to hold two complete copies of the forwarding database. For large forwarding databases, the required additional memory is impractical, particularly in implementations where memory size is constrained by limited circuit board space.

A further drawback of ordered list forwarding database implementations is the large amount of such shared resources needed to perform add entry and delete entry operations. A worst case add entry operation for an ordered list forwarding database requires lg(n+1) read and compare instructions for the binary search to find the relative position for the new entry, where n is the number of forwarding entries prior to the add, and "lg" is logarithm base 2, as is standard notation in the literature. Move instructions to move the entire forwarding database are also required. For a very large forwarding database, or where add and delete entry operations are frequent, this resource requirement for add entry and delete entry operations may significantly prevent other processes from using the shared resource, and potentially result in their starvation.

A known alternative to ordered list implementations uses a Content Addressable Memory (CAM) to store the forwarding database. In CAM implementations, add entry operations (and similarly delete entry operations), consist of writing the address for which forwarding information is to be added (or deleted) to a first register, writing the forwarding information associated with the address to a second register (in the case of an add entry operation), and writing to a third register requesting the internal logic of the CAM to complete the operation. The number of node microprocessor instructions to perform the operation is therefore less than where the forwarding database is kept in an ordered list.

However, CAM based implementations add significant cost in terms of number of transistors. CAMs require up to a factor of 100 more transistors than non-CAM based implementations. For cost sensitive applications, therefore, a CAM solution is not practical.

For these reasons and others, a new forwarding database management system is required, which reduces the time during which the forwarding database is in transition during add entry and delete entry operations, which does not require additional memory to store a working copy of the forwarding database during add entry and delete entry operations, and which also uses a minimum amount of shared resources, such as microprocessor bandwidth, during add and delete entry operations. Moreover, the new forwarding database management system must be economical, and not rely on costly CAM technology to store the forwarding database.

SUMMARY

In accordance with principles of the invention, there is provided a forwarding database management system, where forwarding entries are stored in a forwarding table consisting of various sized forwarding entry sets and free space segments. Each forwarding entry set contains forwarding entries for a related set of addresses.

A plurality of free queues is used to locate free space segments in the forwarding table based on their size. Accordingly, each free queue has an associated free space segment size. Each queue element within a given free queue contains a pointer to a free space segment of size equal to the free space segment size associated with that free queue.

A forwarding entry adding process performs add entry operations. The forwarding entry adding process receives an input, including an address and forwarding information for received frames containing that address. The forwarding entry adding process then determines a new forwarding entry set size by first searching the forwarding table for an existing forwarding entry set, containing forwarding entries for addresses related to the input address. The forwarding entry adding process adds the size of a forwarding entry to the size of the existing forwarding entry set to obtain the new forwarding entry set size.

The forwarding entry adding process next selects a non-empty free queue with the smallest associated free space segment size greater than or equal to the new forwarding entry set size. A queue element from the selected non-empty free queue is dequeued, and the free space segment pointed to by the dequeued queue element is used to store a new forwarding entry set. The new forwarding entry set includes the existing forwarding entry set for addresses related to the input address, plus a new forwarding entry containing the forwarding information included in the input.

Delete entry operations are performed by a forwarding entry deleting process. The forwarding entry deleting process responds to a second input, the second input having an address. The forwarding entry deleting process determines a new forwarding entry set size by locating the existing forwarding entry set for addresses related to the address in the second input, and calculating a new forwarding entry set size, equal to the size of the existing forwarding entry set, minus the size of one forwarding entry.

The forwarding entry deleting process then selects a non-empty free queue with the smallest associated free space segment size equal to or greater than the new forwarding entry set size, and dequeues a queue element from the selected non-empty free queue. The contents of the existing forwarding entry set is then copied, without the forwarding entry having forwarding information associated with the address in the second input, to the free space segment pointed to by the dequeued queue element. The forwarding table space where the existing forwarding entry set was located is then added to a free queue with associated free space segment size equal to the size of the existing forwarding entry set.

In a first example embodiment, the forwarding entry adding process and the forwarding entry deleting process are implemented as programs executing on a microprocessor within a bridge or router. The forwarding table and plurality of free queues are contained in a memory on the bridge or router.

In a second example embodiment, the memory on the bridge or router further contains a hash table. The hash table consists of hash table entries, each hash table entry containing a pointer to a forwarding entry set within the forwarding table, and a size of that forwarding entry set. The size of the forwarding entry set is between 0 and a maximum number. A forwarding entry set of size 0 indicates no forwarding entries are contained in that forwarding entry set, and accordingly, the pointer in that hash table entry is not valid. The index of each hash table entry is a first field of a hash output obtained by applying a hash function to an input address. Therefore, the forwarding entry set indicated by a given hash table entry contains forwarding entries for those input addresses having hash outputs with equivalent first fields.

The need to move existing forwarding entries to accommodate a new forwarding entry is significantly reduced. The forwarding table is never entirely in transition during add and delete entry operations, as was the case in pre-existing systems. The delay in frame forwarding while add and delete entry operations are performed is thus decreased. Similarly, the resources needed for add and delete entry operations are substantially less than required to maintain a sorted list of forwarding entries. As a result, the bridge or router microprocessor, or other shared resource implementing the add entry and delete entry processes, has increased availability to make progress on other tasks it supports.

The forwarding table, free queues and hash table may be standard RAM components, and no complex CAM logic is required. The add and delete entry processes may be implemented as software, firmware, or microcode, executing on a node microprocessor, or as an application specific integrated circuit (ASIC).

These and other features and advantages of the present invention will become apparent from a reading of the detailed description in conjunction with the attached drawings in which like reference numerals refer to like elements in the several views.

BRIEF DESCRIPTION OF THE DRAWINGS

FIG. 2 is a diagram of a typical communications frame;

DETAILED DESCRIPTION

Figure 1:
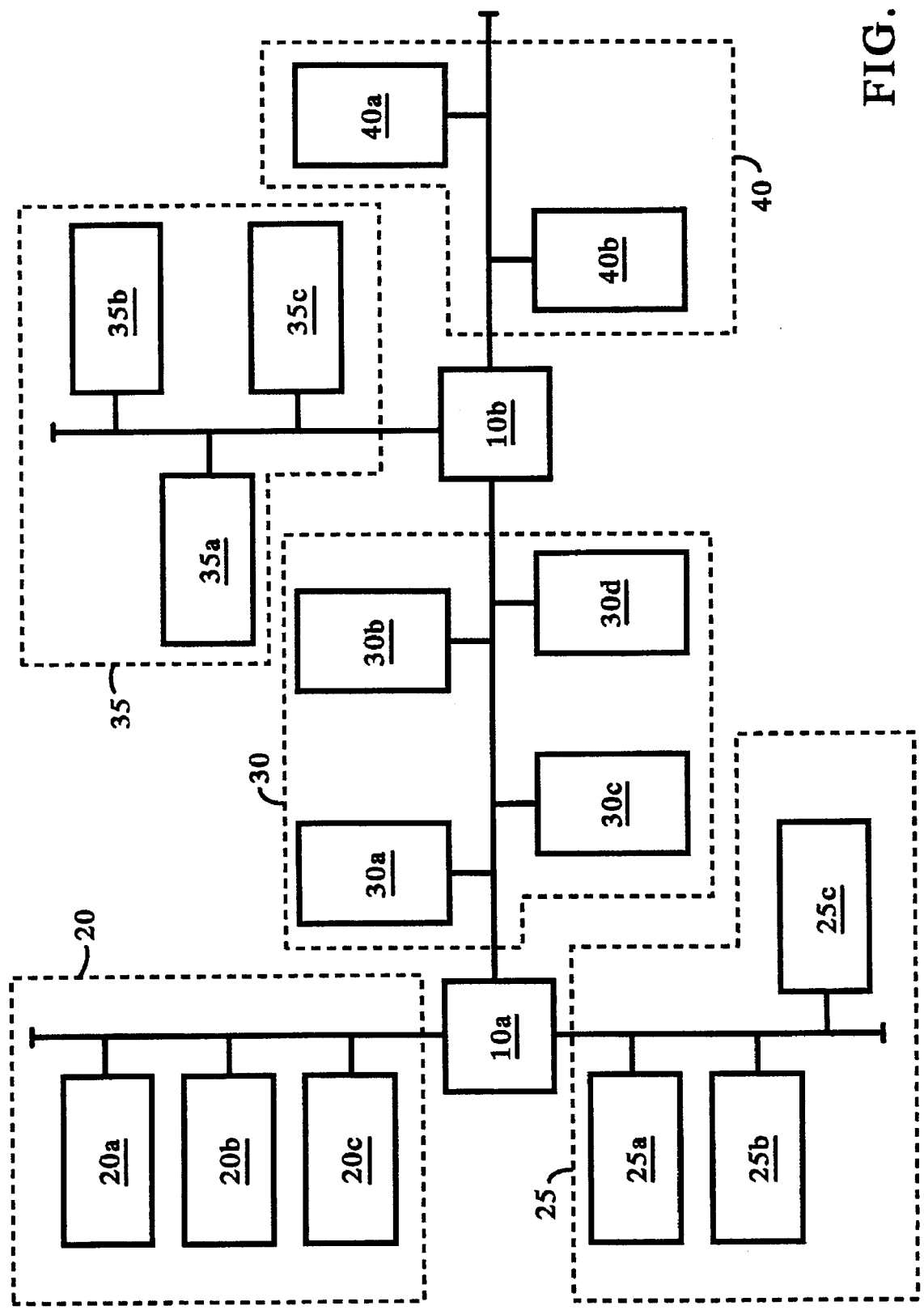
FIG. 1 is a block diagram of an extended local area network (LAN)

FIG. 1 is a block diagram of an extended local area network (LAN). FIG. 1 shows bridges 10a, and 10b interconnecting LAN segments 20, 25, 30, 35, and 40. LAN segments 20, 25, 30, 35 and 40 may be Ethernet, Token Ring, FDDI, or any other LAN protocol or technology. Network stations 20a, 20b, and 20c are within LAN segment 20, stations 25a, 25b and 25c are within LAN segment 25, stations 30a, 30b, 30c, and 30d are within LAN segment 30, stations 35a, 35b and 35c are within LAN segment 35, and stations 40a and 40b are within LAN segment 40. During operation of the elements in FIG. 1, stations sharing a common LAN segment communicate freely among themselves. Stations on different LAN segments require a bridge 10 to communicate.

For example, when station 20a wishes to send a message to station 40a, it builds a frame with a destination address equal to the station address of station 40a, and source address equal to the address of station 20a.

Station 20a then transmits the frame, and bridge 10a receives the frame. Bridge 10a searches its forwarding information database for a forwarding entry having forwarding information for the address found in the destination address field of the frame. If no such forwarding entry is found, bridge 10a broadcasts the frame to all LAN segments to which it is attached, except the LAN segment on which the frame was received. If the forwarding entry is found, it will indicate that the frame should be forwarded to segment 30. In either case, bridge 10b receives the forwarded frame, makes a similar forwarding determination based on the addressing information in the frame, and forwards the frame to LAN segment 40. Station 40a then receives the forwarded frame originally transmitted by station 20a.

Figure 2:
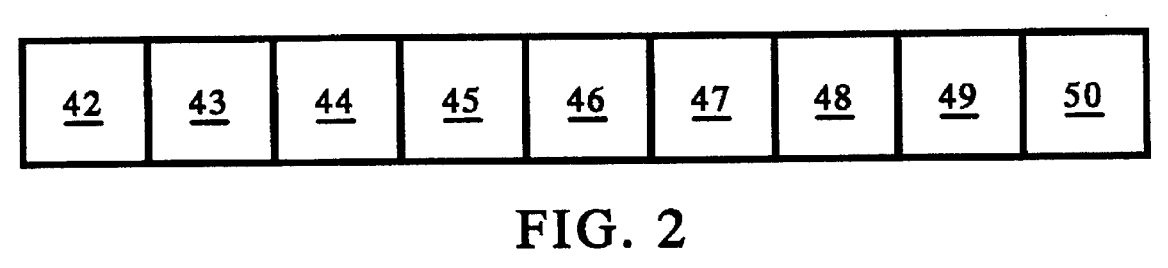

Network stations send information or messages to each other in the form of frames. FIG. 2 shows a typical frame structure, having several fields. The start of the frame is denoted by a preamble field 42 and a start frame delimiter field 43 which further denotes the beginning of the frame. Start frame delimiter field 43 is followed by a frame control field 44, indicating whether the bit stream is a token or frame, and, if it is a frame, what type of frame it is.

The next two fields are destination address field 45, and source address field 46. Each station within a LAN has a unique station address. Destination address field 45 generally contains a station address of the intended recipient of the frame, while source address field 46 contains the station address identifying the source of the frame.

Destination address field 45 and source address field 46 are part of what is known as the addressing information of a frame. Frame formats other than that shown in FIG. 2 may contain additional addressing information in other fields.

An information field 47 follows the source address field 46, and is in turn followed by a frame check sequence field 48 containing an error detection sequence used by the receiving stations to detect errors in the frame control field 44, destination address field 45, source address field 46, or information field 47. The end of the frame is denoted by an end delimiter 49, which defines the end of the frame, and a frame status flag field 50 containing a set of status flags.

A. Adding Forwarding Entries

Figure 3:
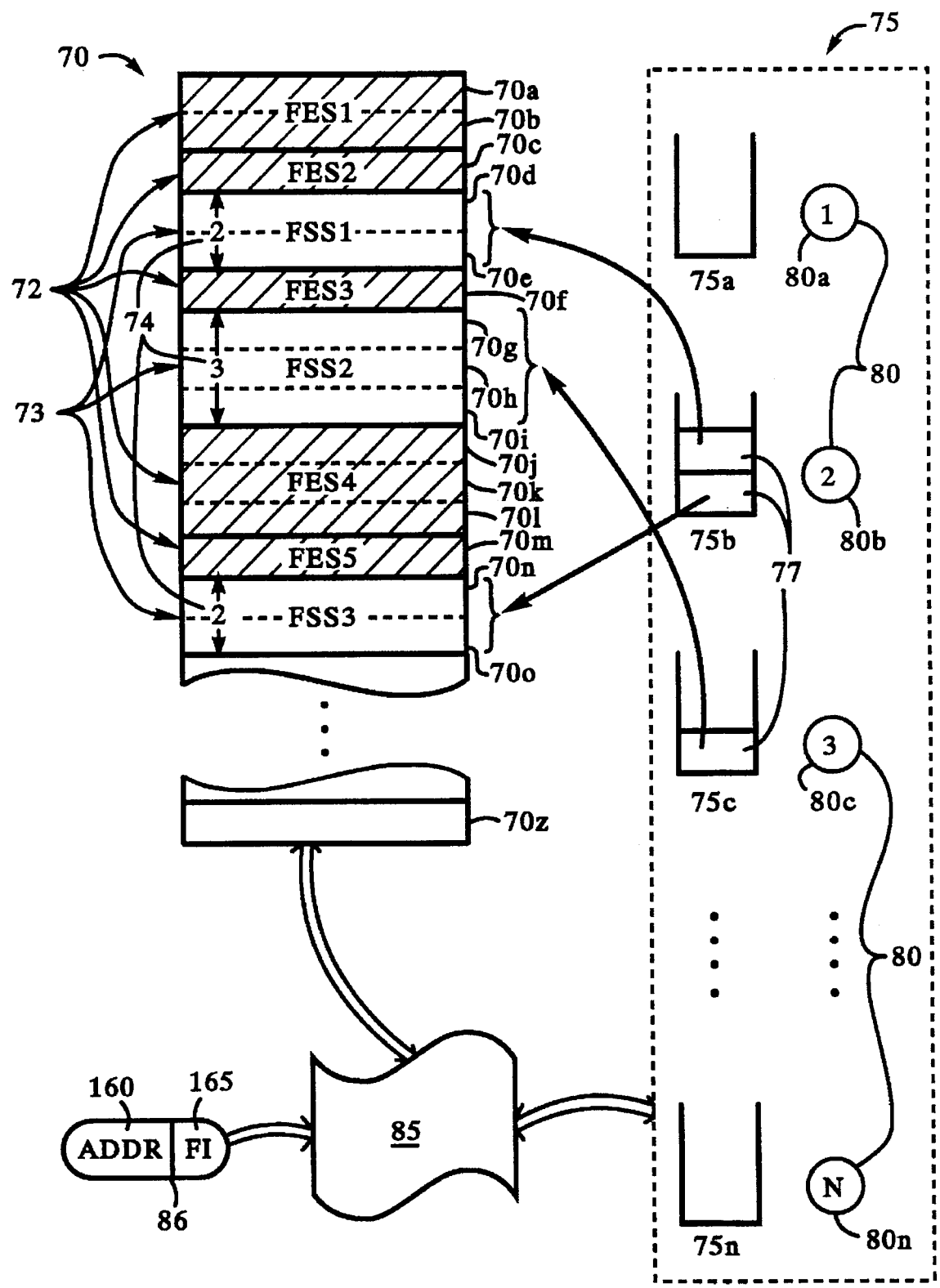
FIG. 3 is a diagram of elements in an apparatus for maintaining frame forwarding information.

FIG. 3 is a diagram showing the elements of an apparatus for maintaining frame forwarding information, including a forwarding table 70 consisting of words 70a, 70b, 70c . . . 70z. Each word is equal in size to a single forwarding entry. The words 70a, 70b, 70c . . . 70z are organized into forwarding entry sets 72 (FES1, FES2, FES3, FES4 and FES5) of different sizes, each one of the forwarding entry sets 72 containing one or more forwarding entries for a set of one or more related addresses. The size of each one of forwarding entry sets 72 is the number of forwarding entries it contains. Those words 70a, 70b, 70c . . . 70n not within forwarding entry sets 72 are organized into free space segments 73 (FSS1, FSS2, and FSS3), each one of free space segments 73 having a size 74, the size 74 being the number of words in that free space segment.

Further shown in FIG. 3 is a plurality of free queues 75 (75a, 75b, 75c . . . 75n), having associated free space segment sizes 80 (80a, 80b, 80c . . . 80n). Each individual free queue (75a, 75b, 75c . . . . 75n) contains zero or more queue elements 77. Each queue element 77 contains a pointer to one of free space segments 73 in forwarding table 70 of size 74 equal to the associated free space segment size (80a, 80b, 80c . . . 80n) of the free queue (75a, 75b, 75c . . . . 75n). Accordingly, any given one of the plurality of free queues 75 contains a queue element for each free space segment 73 having size 74 equal to the associated free space segment size for that given free queue. For example, free queue 75a has an associated free space segment size 80a of 1 (two). None of the free space segments 73 shown in FIG. 3 have size 74 equal to 1 (one), therefore free queue 75a has no queue elements, and is therefore empty. Similarly, the queue elements in free queue 75b indicate free space segments FSS1 and FSS3, having size 74 of 2 (two), and the queue element in free queue 75c indicates FSS2 having a size 74 of 3 (three).

In a first embodiment, the queue elements themselves are contained within the corresponding free space segments, and connected by pointers, as a linked list.

In a preferred embodiment, the size of each one of the forwarding entry sets 72 is between 1 and a maximum number. The number of free queues in the plurality of free queues 75 is equal to that maximum number. For example, in an embodiment where the maximum size of each one of the forwarding entry sets 72 is seven, then there are 7 free queues 75. The associated free space segment size 80 of each of the plurality of free queues 75 equal each of the possible sizes of the forwarding entry sets 72 In the embodiment where the maximum size of each one of the forwarding entry sets 72 is seven, the associated free space segment sizes 80 would therefore be 1,2,3,4,5,6 and 7.

FIG. 3 further shows a forwarding entry adding process 85, responsive to an input 86. The forwarding entry adding process 85 has access to the forwarding table 70 and the plurality of free queues 75. The input 86 contains an address 160, and forwarding information 165. In the example embodiments, the address 160 is a station address, and the forwarding information 165 relates to forwarding of frames received with destination address field contents equal to the address 160.

During operation of the elements shown in FIG. 3, the forwarding entry adding process 85 receives the input 86, and determines a new forwarding entry set size. The new forwarding entry set size is equal to the size of the existing forwarding entry set for addresses related to the address 160, plus the size of a forwarding entry.

The forwarding entry adding process 85 next selects a nonempty free queue from the plurality of free queues 75. A free queue is non-empty if it contains at least one queue element. In FIG. 3, for example, free queues 75*b* and 75*c* are non-empty. The selected non-empty free queue has the smallest associated free space segment size 80, equal to or greater than the new forwarding entry set size, of any non-empty free queue in the plurality of free queues 75. The forwarding information adding process 85 then writes a new forwarding entry set, including the contents of the existing forwarding entry set for addresses related to the address 160, and a forwarding entry containing the forwarding information 165, to a free space segment 73 indicated by one of the queue elements 77 contained in the selected non-empty free queue.

Figure 4:
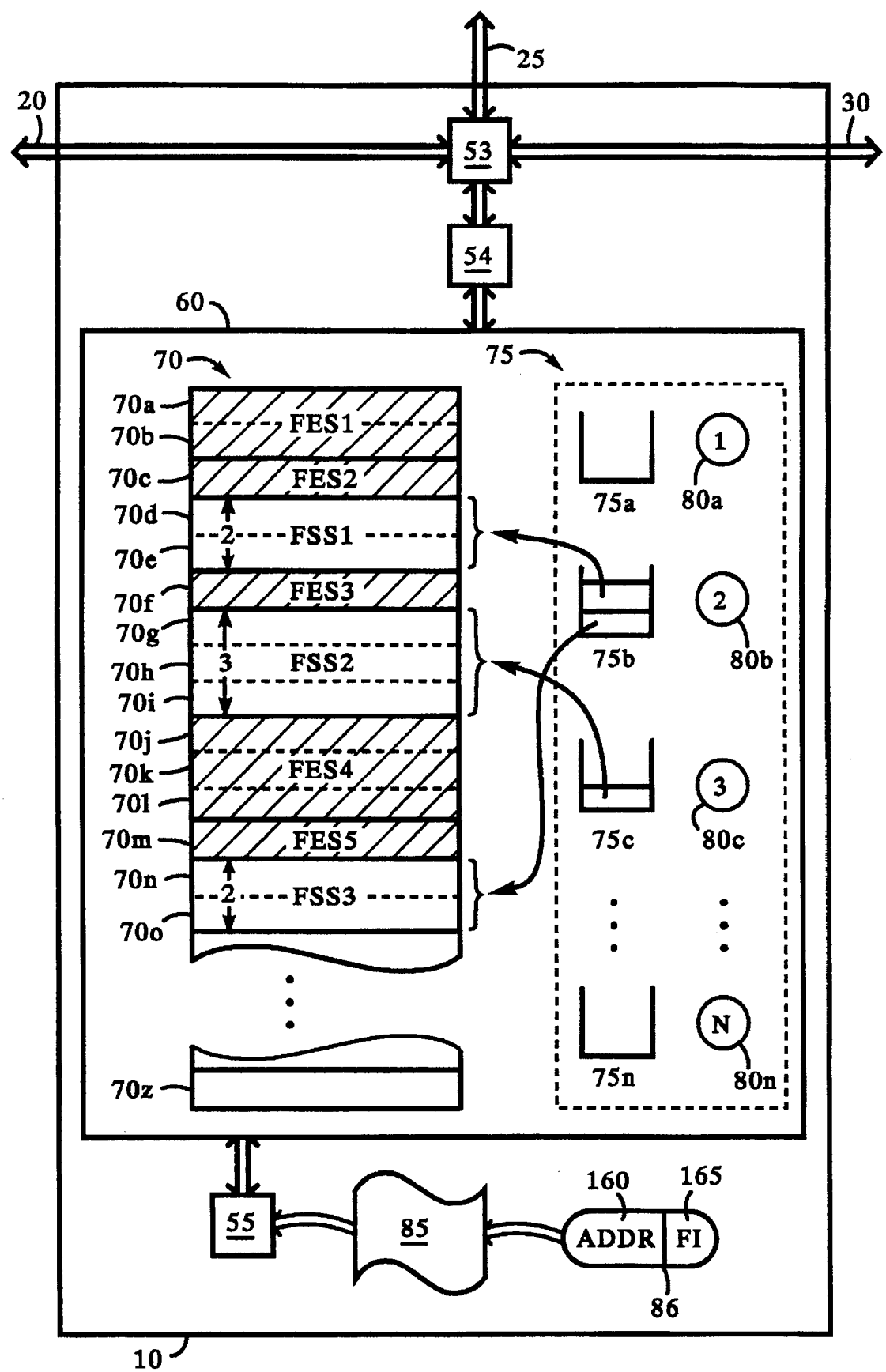
FIG. 4 is a diagram of a first example embodiment of an apparatus for maintaining frame forwarding information.

FIG. 4 shows a first example embodiment of an apparatus for maintaining forwarding information within a bridge 10, coupled with LAN segments 20, 25 and 30. The bridge 10 includes a memory 60, a microprocessor 55, a transceiver circuit 53, a frame forwarding circuit 54, and a forwarding information adding process 85. The memory 60 contains the forwarding table 70, and the plurality of free queues 75. The transceiver circuit 53 is coupled with the frame forwarding circuit 54 and the LAN segments 20, 25 and 30. The frame forwarding circuit 54 is coupled with the transceiver circuit 53, and the memory 60. The forwarding information adding process 85 is a program running on the microprocessor 55, and has access to the memory 60 via microprocessor 55.

During operation of the elements of FIG. 4, the forwarding entry adding process 85 receives the input 86, and accesses the memory 60 to determine the new forwarding entry set size, select a non-empty free queue, and write the new forwarding entry set to the forwarding table 70.

As frames are received from the LAN segments 20, 25 and 30, the transceiver circuit 53 indicates to the frame forwarding circuit 54 which LAN segment each frame is received on. The frame forwarding circuit 54 forwards frames based on the indication of which LAN segment the frame was received on, the contents of the addressing information in each frame, and the contents of the forwarding table 70.

The frame forwarding circuit 54 implements the basic bridging function. For each frame received, the frame forwarding circuit 54 searches the forwarding table 70 for a forwarding entry having forwarding information for the address contained in the destination address field of the received frame. If such a forwarding entry is found, the frame forwarding circuit 54 forwards the frame to the LAN segment specified in the forwarding information field of the forwarding entry. If the specified LAN segment is the one from which the frame was received, the frame is dropped. If no such forwarding entry is found, the frame forwarding circuit 54 forwards the frame onto all LAN segments to which the bridge is attached, except the one from which it was received.

Figure 5:
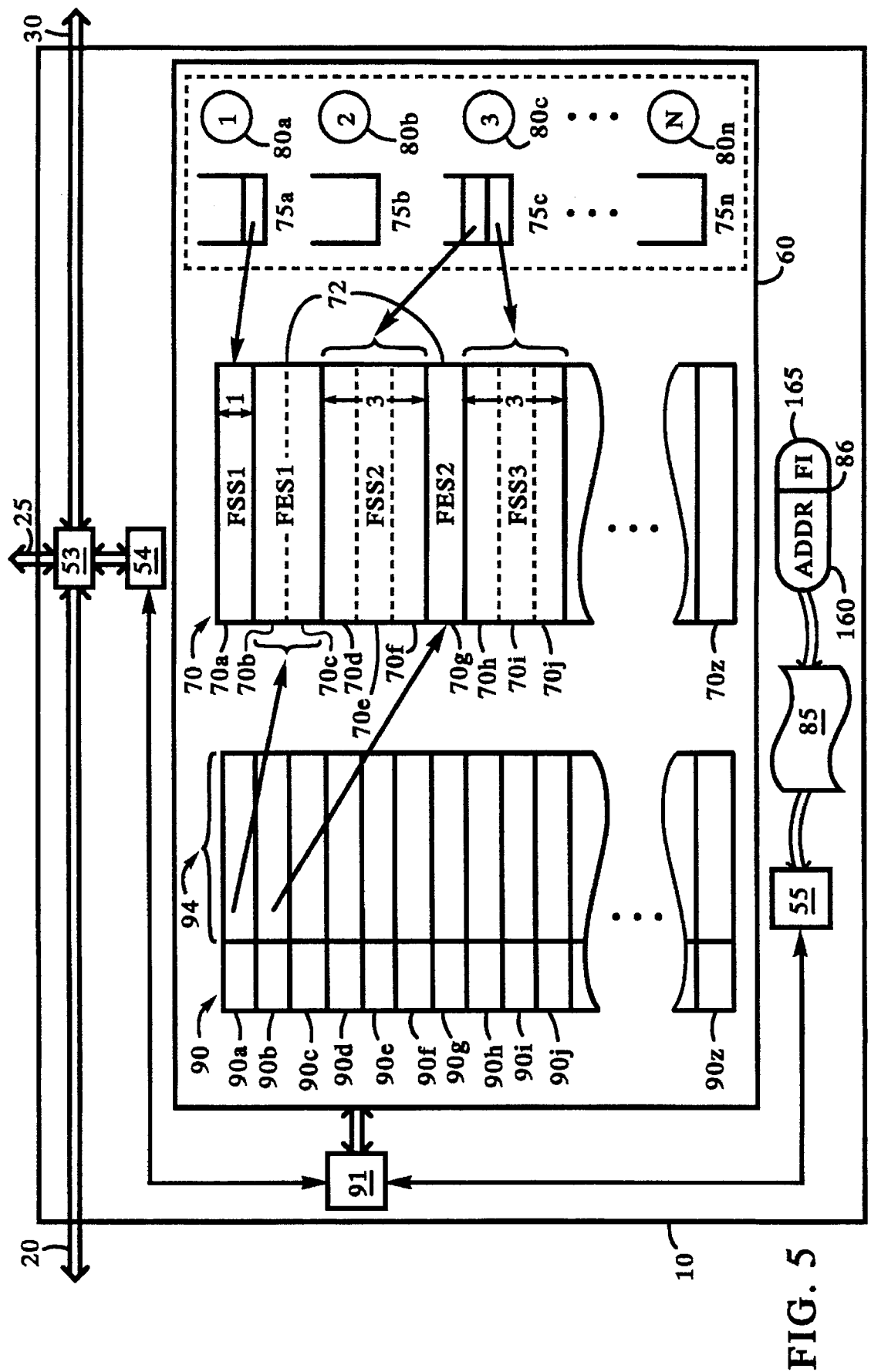
FIG. 5 is a diagram of a second example embodiment of an apparatus for maintaining frame forwarding information.

FIG. 5 shows a second example of an apparatus for maintaining forwarding information within a bridge 10, coupled with LAN segments 20, 25 and 30. The bridge 10 includes a memory 60, a microprocessor 55, a transceiver circuit 53, a frame forwarding circuit 54, a mutual exclusion circuit 91 and a forwarding information adding process 85. The memory 60 contains the forwarding table 70, a hash table 90, and the plurality of free queues 75. The hash table 90 contains a plurality of hash table entries 90*a*, 90*b*, 90*c* . . . 90*z*, each hash table entry having a pointer field 94. The pointer field 94 in each one of hash table entries 90*a*, 90*b*, 90*c* . . . 90*z* points to one of the forwarding entry sets 72 in the forwarding table 70.

The transceiver circuit 53 is coupled with the frame forwarding circuit 54 and the LAN segments 20, 25 and 30. The frame forwarding circuit 54 is coupled with the transceiver circuit 53, and the mutual exclusion circuit 91. The forwarding information adding process 85 is a program running on the microprocessor 55, having access to the memory 60 via the microprocessor, by way of the mutual exclusion circuit 91. The mutual exclusion circuit 91 is coupled with the memory 60, the microprocessor, and the frame forwarding circuit 54.

During operation of the elements of FIG. 5, a new forwarding entry is added to forwarding table 70 by the forwarding entry adding process 85. The forwarding entry adding process 85 receives the input 86, including address 160 and forwarding information 165. The forwarding entry adding process 85 accesses the memory 60 to determine a new forwarding entry set size, select a non-empty free queue, and write a new forwarding entry set to forwarding table 70.

To determine a new forwarding entry set size, the forwarding entry adding process applies a hash function to the address 160, and obtains a hash output having a hash table index field. The hash table index field indicates a hash table entry, for example 90*a*, in the hash table 90. The pointer field 94 in the hash table entry 90*a* points to existing forwarding entry set FES1 in the forwarding table. The size of the existing forwarding entry set FES1, in this case two, is then added to the size of a forwarding entry to determine the new forwarding entry set size. Therefore, in the example in FIG. 5, the new forwarding entry set size is 3.

The forwarding entry adding process 85 next selects a nonempty free queue having the smallest associated free space segment size equal to or greater than the new forwarding entry set size. In the example of FIG. 5, the selected non-empty free queue is 75*c*, having associated free space segment size 80*c* equal to 3.

The forwarding entry adding process 85 then writes a new forwarding entry set by copying the existing forwarding entry set FES1, together with a new forwarding entry containing the forwarding information 160, to a free space segment indicated by a queue element dequeued from the selected non-empty free queue 75*c*. As a final step of writing the new forwarding entry set, the forwarding entry adding process 85 writes the location of the new forwarding entry set to the pointer field 94 in the hash table entry 90*a*.

The mutual exclusion circuit 91 ensures that the frame forwarding circuit 54 cannot access the hash table 90 while the forwarding entry adding process 85 is writing the location of the new forwarding entry set to the pointer field of the hash table entry 90*a*. In this way, the frame forwarding circuit 54 is prevented from accessing either a partially written hash table entry, or a partially created forwarding entry set.

After writing the new forwarding entry set, and writing the location of the new forwarding entry set to the pointer field 94 in the hash table entry 90*a*, the forwarding entry adding process 85 selects a second free queue from the plurality of free queues 75. The second free queue has an associated free space segment size equal to the size of the existing forwarding entry set FES1, in this case, free queue 75b, having an associated free space segment size 80b of 2 (two). The forwarding entry adding process 85 then adds a new queue element to the selected second free queue (75b), the new queue element indicating the existing forwarding entry set FES1 as a free space segment.

Figure 6:
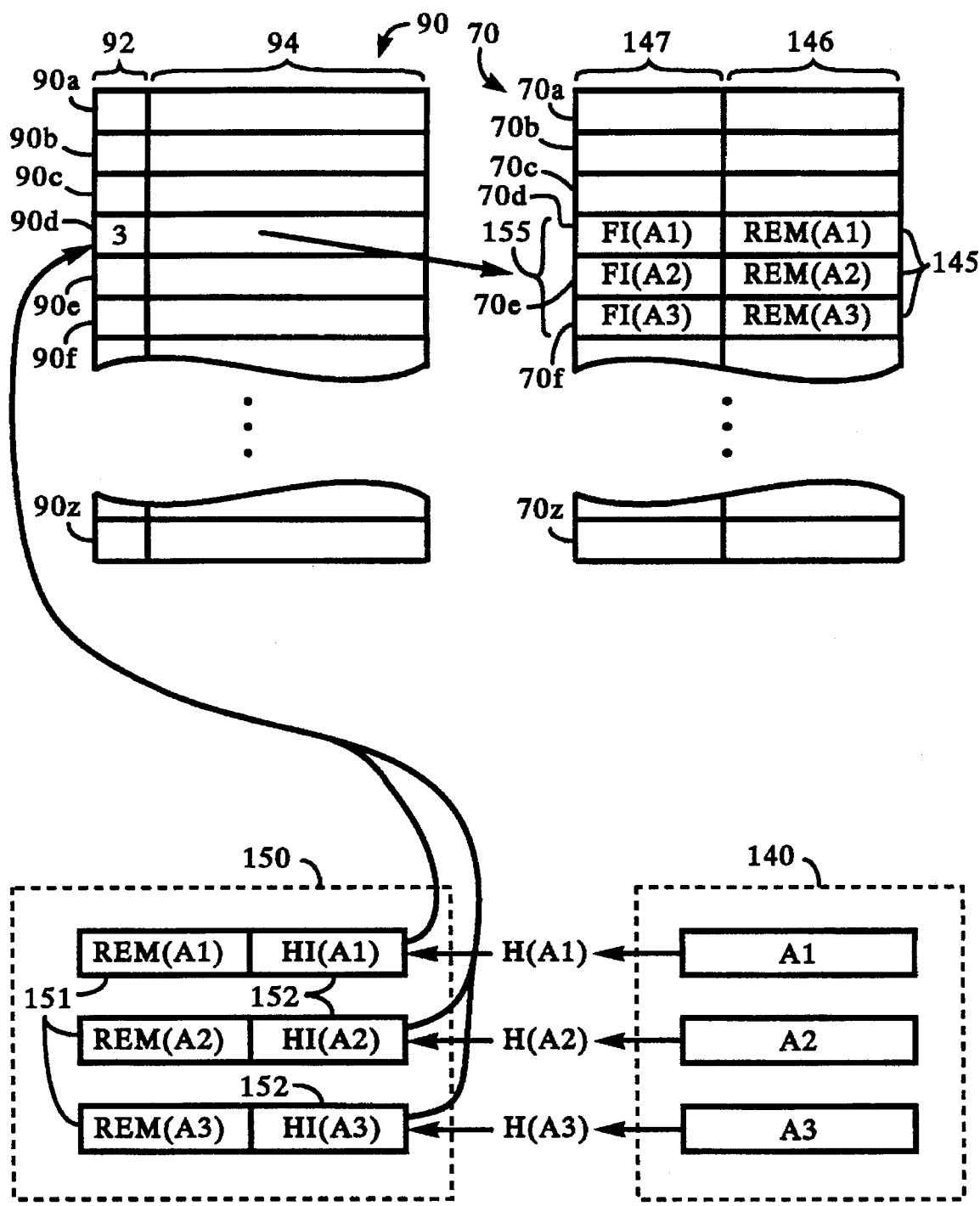
FIG. 6 is a diagram of the relationship of forwarding entries in a forwarding entry set in the second example embodiment.

FIG. 6 is a diagram showing the relationship of forwarding entries in a forwarding entry set in the second example embodiment. A set of related addresses 140, is shown consisting of addresses A1, A2, and A3. A set of hash outputs 150, is shown corresponding to the set of related addresses 140, such that hash output H(A1) is the hash output obtained by applying a hash function to the address A1, hash output H(A2) is the hash output obtained by applying the hash function to the address A2, etc.

Hash outputs 150, for the addresses 140, are shown having a remainder field 151 and a hash table index field 152. The hash table index field 152 of the hash outputs 150 are equal for all the related addresses 140, and indicate hash table entry 90d. Hash table entry 90d includes a pointer field 94 pointing to word 70d in the forwarding table 70. The size field 92 in the hash table entry 90d indicates the size of the forwarding entry set beginning at word 70d, having forwarding entries 145. Each one of forwarding entries 145 has a hash remainder field 146 and a forwarding information field 147. For a given one of forwarding entries 145, the contents of the hash remainder field 146 is equal to the remainder field 151 of the hash output 150 for the specific one of the addresses 140 for which the forwarding information field 147 contains forwarding information.

B. Deleting Forwarding Entries

Figure 7:
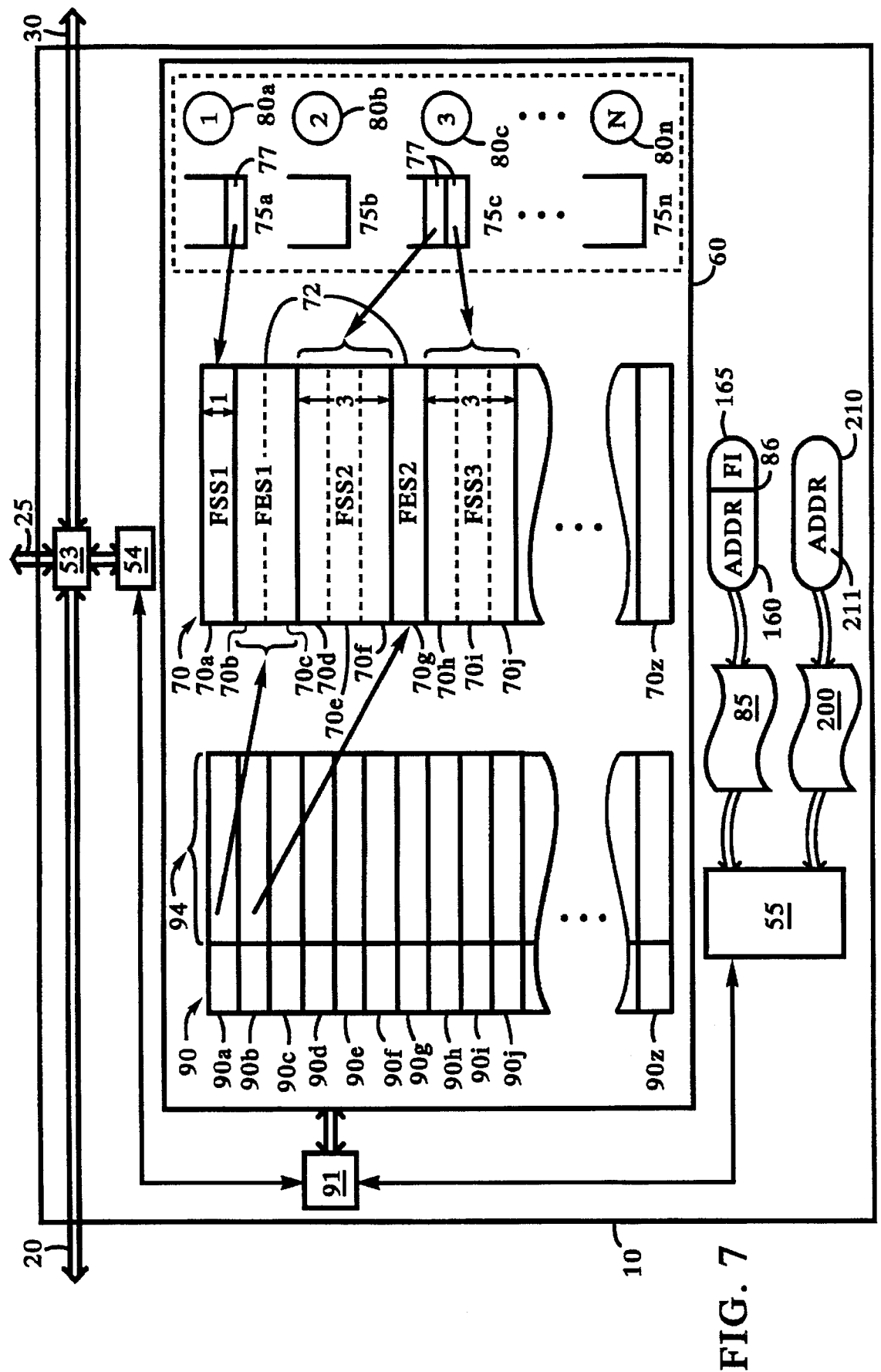
FIG. 7 is a diagram of a third example embodiment of an apparatus for maintaining frame forwarding information.

FIG. 7 is a diagram showing elements of a third example embodiment of an apparatus for maintaining forwarding information. The third example embodiment includes the elements of the second example embodiment shown in FIG. 5 and described above, and also a forwarding entry deleting process 200, having a second input 210, the second input 210 having an address 211. In the example embodiments, the address 211 is a station address.

During operation of the elements shown in FIG. 7, the forwarding entry deleting process 200 deletes a forwarding entry in the forwarding table 70. The forwarding entry deleting process 200 receives the second input 210, and first determines a new forwarding entry set size. The new forwarding entry set size is equal to the size of the existing forwarding entry set having forwarding entries for addresses related to the address 211, minus the size of a forwarding entry.

The forwarding entry deleting process 200 next selects a nonempty free queue from the plurality of free queues 75. A free queue is non-empty if it contains at least one queue element. In FIG. 7, for example, free queues 75b and 75c are non-empty. The selected non-empty free queue has the smallest associated free space segment size 80, equal to or greater than the new forwarding entry set size, of any non-empty free queue in the plurality of free queues 75. The forwarding entry deleting process 200 then writes a new forwarding entry set, including the contents of the existing forwarding entry set having forwarding entries for addresses related to the address 160, without the forwarding entry containing forwarding information for the address 211, to a free space segment 73 indicated by one of the queue elements 77 contained in the selected non-empty free queue.

After writing the new forwarding entry set, the forwarding entry deleting process 200 selects a second free queue from the plurality of free queues 75. The second free queue has an associated free space segment size 80 equal to the size of the existing forwarding entry set having forwarding entries for addresses related to the address 211. The forwarding entry deleting process 200 then adds a new queue element to the selected second free queue, the new queue element indicating the existing forwarding entry set as a free space segment.

Figure 8:
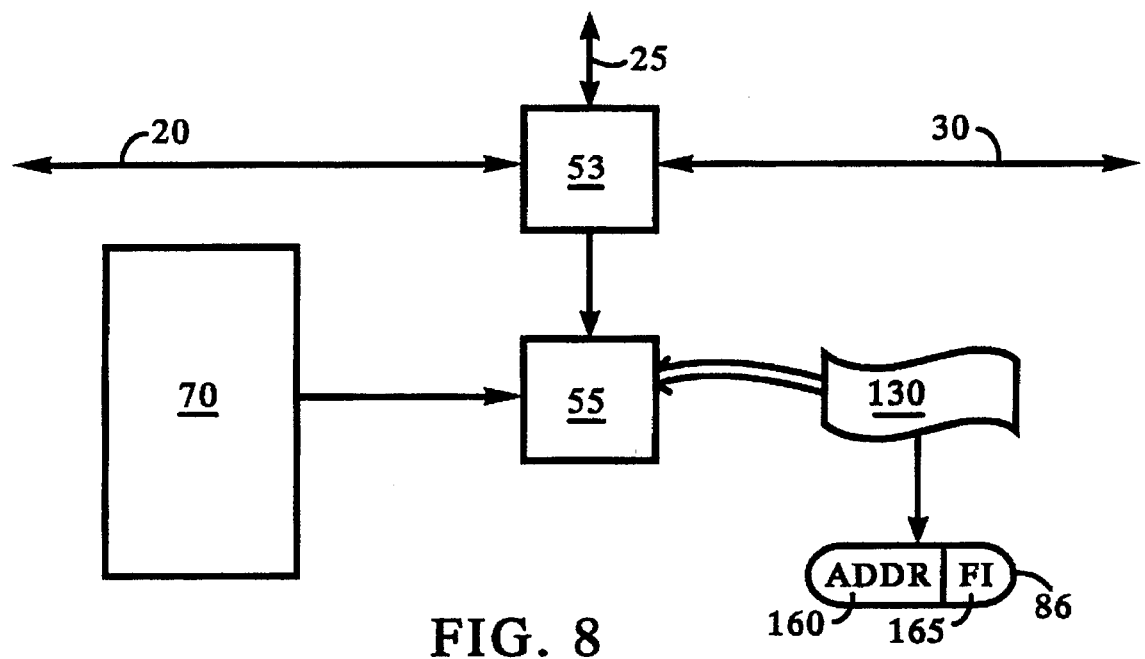
FIG. 8 is a diagram of elements in a fourth example embodiment of an apparatus for maintaining frame forwarding information.

FIG. 8 is a diagram of a fourth example embodiment of an apparatus for maintaining forwarding information. A transceiver circuit 53, coupled with LAN segments 20, 25, and 30, is also coupled with the microprocessor 55. The microprocessor 55 is further coupled with forwarding table 70. A learning process 130, implemented as a program running on the microprocessor 55, has access, via the microprocessor 55, to the forwarding table 70 and the transceiver circuit 53. The learning process 130 generates the input 86, the input 86 having an address 160 and forwarding information 165.

During operation of the elements in FIG. 8, the learning process 130 generates the input 86, as it learns the location of stations on the LAN segments 20, 25, and 30 from the addressing information in frames received by the transceiver 53. Specifically, when transceiver circuit 53 receives a first frame from one of the LAN segments 20, 25 and 30, it passes a station address equal to the contents of the source address field of the first frame, and indication of which one of LAN segments 20, 25 and 30 the first frame was received from, to the learning process 130. The learning process 130 then determines whether a forwarding entry having forwarding information for that station address exists in the forwarding table 70. If no such forwarding entry is found, the learning process 130 generates the input 86 with address 160 equal to the station address from the source address field of the first frame, and forwarding information 165 indicating that subsequent frames received with that station address as destination address should be forwarded to the one of LAN segments 20, 25 and 30 from which the first frame was received.

Figure 9:
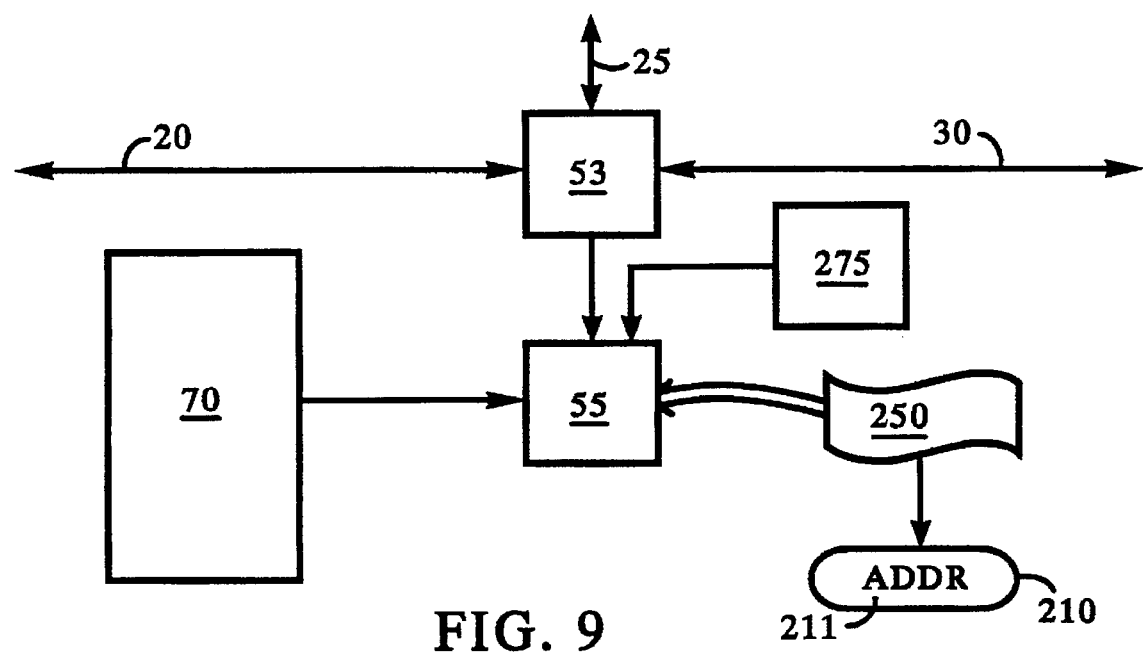
FIG. 9 is a diagram of elements in a fifth example embodiment of an apparatus for maintaining frame forwarding information.

FIG. 9 is a diagram showing a fifth example embodiment of an apparatus for maintaining forwarding information. The transceiver 53 is coupled with LAN segments 20, 25 and 30, and the microprocessor 55. The microprocessor is further coupled with the forwarding table 70, and a timer 275. An aging process, implemented as a program running on the microprocessor 55, has access, via the microprocessor 55, to the transceiver circuit 53, the timer 275, and the forwarding table 70. The second input 210, having address 211, is shown as an output of the aging process 250.

During operation of the elements in FIG. 9, the aging process 250 generates the second input 210, when a predetermined time period expires without receipt of a frame with either destination or source address field contents equal to a given station address. The address 211 in the second input 210 is equal to the given station address.

Specifically, the elements in FIG. 9 perform the following steps. The timer 275 expires at a first time, and notifies the aging process 130 of the expiration. The aging process 130 then accesses the forwarding table 70 to clear a 'seen' bit in each forwarding entry in the forwarding table 70. Next, the transceiver circuit 53 receives frames, and passes the station addresses contained in the source address and destination address fields of each frame to the aging process 130. The aging process 130 then sets the 'seen' bit in the forwarding entries having forwarding information for these station addresses. When the timer 275 expires at a second time, the aging process 130 scans the forwarding table 70, and each time it finds a forwarding entry with a clear 'seen' bit, the aging process 130 generates the second output 210, having address 211 equal the station address for which that forwarding entry contains forwarding information.

Figure 10:
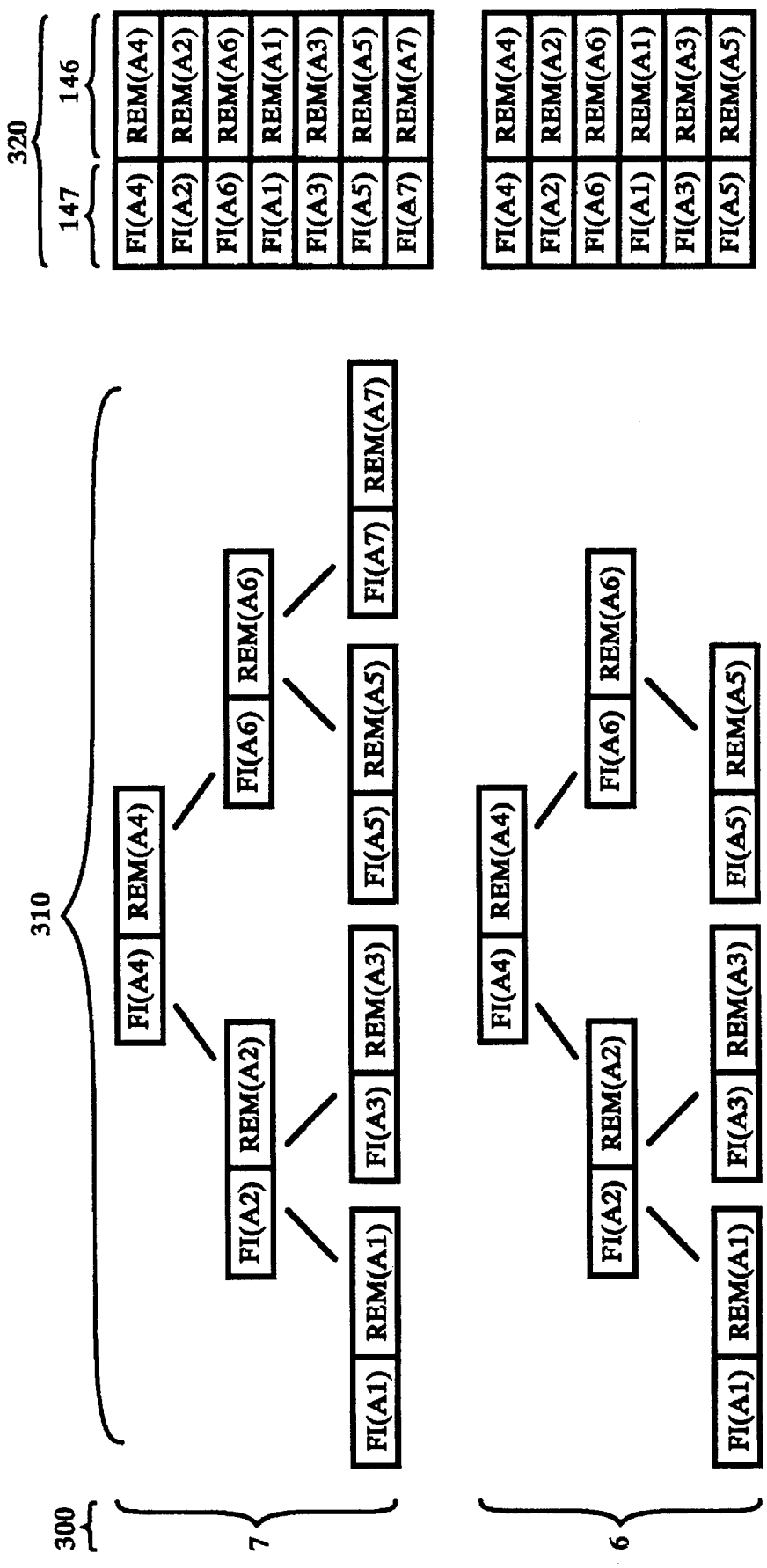
FIG. 10 is a diagram of a preferred configuration of forwarding entries within a forwarding entry.
Figure 10:
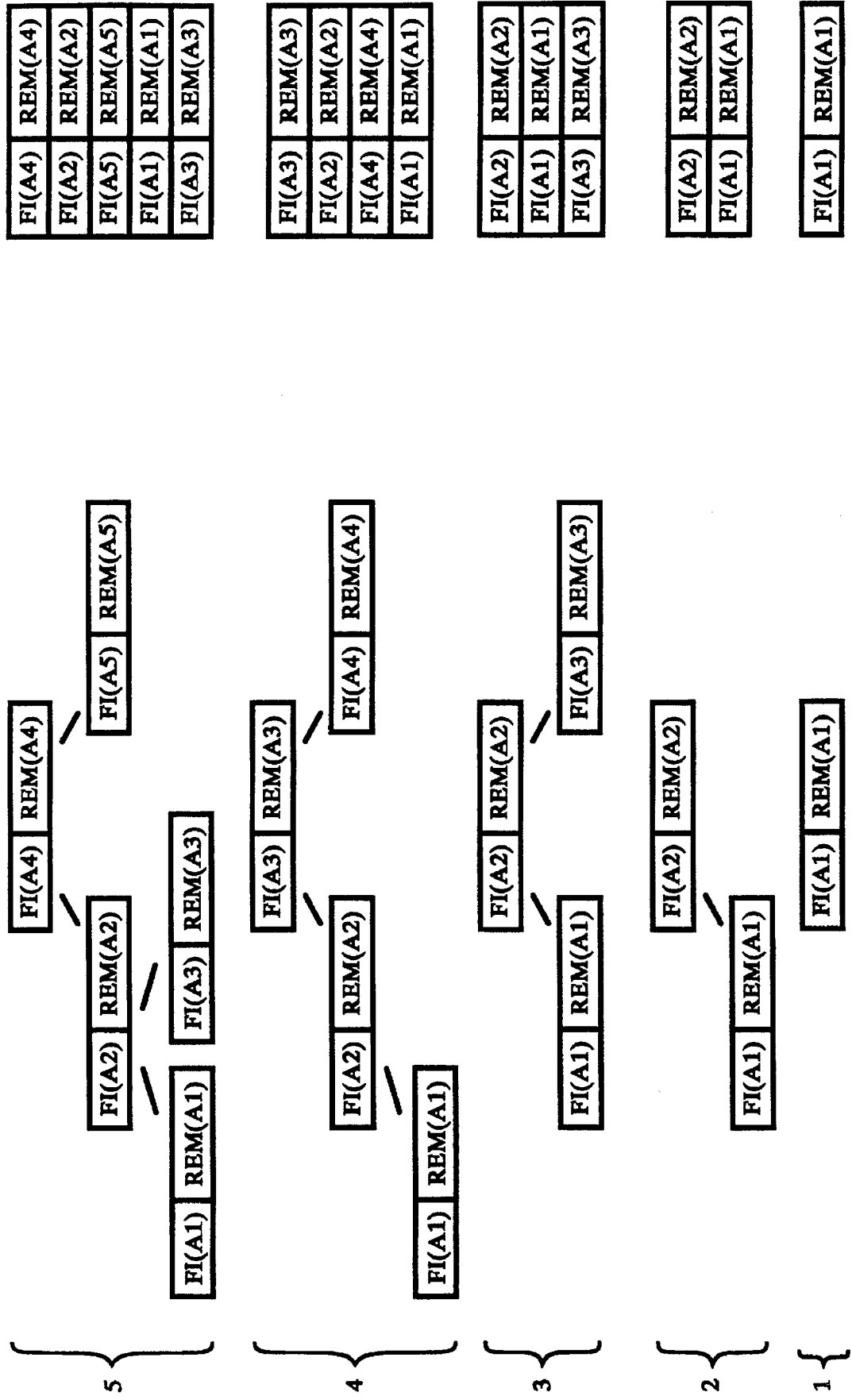

C. Preferred Configuration of Forwarding Entries within Forwarding Entry Sets FIG. 10 is a diagram showing a preferred configuration of forwarding entries within a forwarding entry set. Each forwarding entry set consists of a balanced binary tree of between one and a maximum number of forwarding entries. The height of a tree is defined to be its maximum level, the length of the longest path from the root to an external node. A binary tree is balanced if the height of the left subtree of every node never differs by more than plus or minus one from the height of its right subtree. Therefore, when a balanced binary tree has N elements, the height of the tree is lg(N−1). The height of the tree also defines the worst case number of queries to find a forwarding entry within the tree.

In FIG. 10, column 300 shows the forwarding entry set size in terms of forwarding entries, column 310 shows the fully balanced tree for each forwarding entry set, and column 320 shows the arrangement in memory of forwarding entries within each forwarding entry set. The forwarding entries each consist of a remainder field 146, containing the remainder field of the hash output for a given station address, and a forwarding information field 147, containing forwarding information for that given station address. For example, the forwarding entry containing forwarding information for station address A1 has remainder field contents REM(A1), and forwarding information field contents FI(A1). Similarly, the forwarding entry containing forwarding information for station address A2 has a remainder field contents of REM(A2), etc. In the example of FIG. 10, the remainder fields have the following relationship: REM(A1)<REM(A2)<REM(A3)<REM(A4)<REM(A5)<REM(A6)<REM(A7).

Using the preferred configuration of forwarding entries within forwarding entry sets shown in FIG. 10, the following steps are performed to locate the forwarding entry containing forwarding information for a given station address A. First, a hash output is obtained by applying a hash function to A. The hash output has a hash index field, and a remainder field. The hash index field is used to locate a hash table entry in the hash table. The location of a forwarding entry set is obtained using a pointer contained in the hash table entry. A search of the forwarding entry set is then performed by traversing the forwarding entry set, comparing the remainder field of the hash output with the remainder field 146 of the forwarding entries in the forwarding entry set. When a match is found, the forwarding entry contains forwarding information for A.

During a delete entry operation with the preferred configuration of FIG. 10, the forwarding entry deleting process finds the size of the existing forwarding entry set having forwarding entries for addresses related to the address (for example A5) in the second input by performing the following steps. First, the delete entry operation obtains a hash output by applying a hash function to the address A5. The hash output has a remainder field REM(A5), and a hash table index field HI(A5). Next, the hash index field HI(A5) is used to locate a hash table entry in the hash table. The hash table entry contains a pointer to an existing forwarding entry set having forwarding entries for addresses related to the address AS, and the size of that forwarding entry set. The forwarding entry deleting process then selects a non-empty free queue having the smallest associated free space segment size greater than or equal to the size of the existing forwarding entry set.

The forwarding entry deleting process writes a new forwarding entry set, without the forwarding entry containing forwarding information for the address A5, by first searching the balanced binary tree. The remainder field REM(A5) of the hash output field of the hash output for the second input address is compared with the remainder field 146 of the first forwarding entry within the forwarding entry set. If the two values match, the forwarding information field for the forwarding entry contains forwarding information FI(A5) for the input address A5, therefore the forwarding entry is deleted, and not written to the new forwarding entry set. Otherwise, the forwarding entry set is traversed by selecting the next forwarding entry as a function of the comparison of the remainder field 146 of the forwarding entry with the remainder REM(AS) of the hash output for the second input address A5. If the remainder field REM(A5) of the hash output is less than the remainder field of the forwarding entry, then the left branch is selected. If the remainder of the hash output is greater than the remainder field of the forwarding entry, then the right branch is selected. This sequence is repeated until a match is found, or the tree is searched to its complete depth, indicating that no forwarding entry exists for the address A5.

The forwarding entry adding process locates the position of the new forwarding entry to be added by first performing a search as described above. However, when no match is found, and the tree has been searched to its complete depth, the forwarding entry adding process inserts a new forwarding entry containing the forwarding information in the input as a child of the last forwarding entry searched.

In either an add entry or delete entry operation, a final rebalancing step may need to be performed in order to maintain the balance of the binary tree of forwarding entries in the forwarding entry set. The rebalancing step consists of retracing the path upward from the newly added forwarding entry (or from the site of the deletion) to the root of the tree. As the path is followed upwards, the tree is checked to see if a subtree has lost its balance, where either a taller subtree has grown taller in an add entry operation, or a shorter subtree has grown shorter in a delete entry operation. When such an occurrence is found, an operation known as a rotation must be applied to the tree. In the case of an add entry operation, applying a rotation at the first such occurrence will completely rebalance the tree. In the case of a delete entry operation rotations may need to be applied at many points along the way up to the root. For further description of insertion and deletion algorithms for balanced binary trees, see The Art of Computer Programming, Volume 3/Sorting and Searching, Addison-Wesley Publishing Company, Reading Mass., 1973, by Donald E. Knuth, pages 451 through 470, all references of which are included herein by reference.

In a preferred embodiment, the number of forwarding entries in any one of the forwarding entry sets is between 1 and a maximum of 7. Accordingly, there are 7 free queues, having associated free space segment sizes 1, 2, 3, 4, 5, 6 and 7. In this way, whenever the add entry or delete entry process creates a new forwarding entry set, there is a free queue having an associated free space segment size equal to the size of the new forwarding entry set. If that free queue is non-empty, it is selected, and the new forwarding entry set written to a free space segment indicated by a queue element from that free queue. In this way, a best fit free space segment is located for each newly created forwarding entry set.

Figure 11:
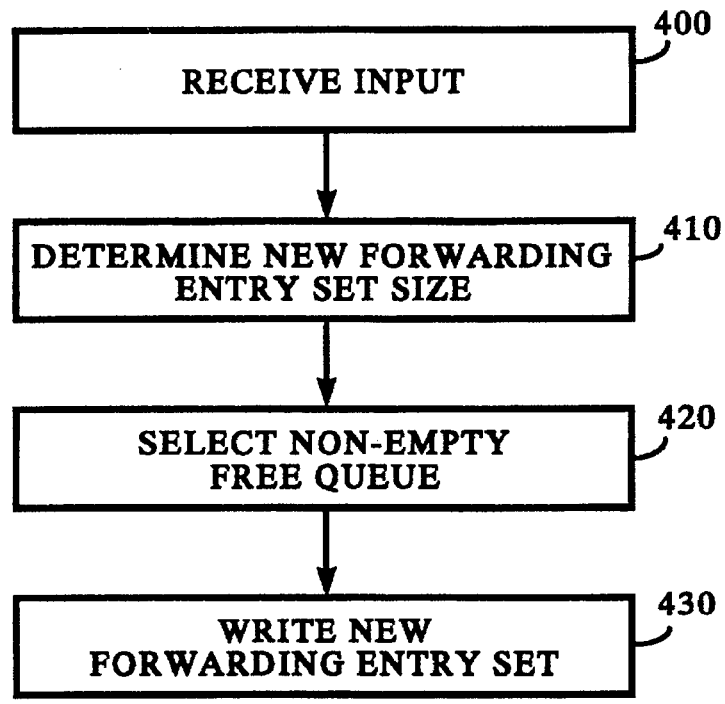
FIG. 11 is a flow chart showing the steps of a method for adding forwarding information to a forwarding table.

FIG. 11 shows a method for adding forwarding information to a forwarding table. In step 400, an input containing a station address and forwarding information is received. In step 410, a new forwarding entry set size is determined. Step 410 includes the activities of locating an existing forwarding entry set for station addresses related to the station address contained in the input, and adding the size of the existing forwarding entry set to the size of a forwarding entry.

In step 420, a non-empty free queue is selected from a set of free queues. The selected non-empty free queue has at least one queue element, and contains queue elements pointing to free space segments in the forwarding table of size equal to or greater than the new forwarding entry size.

Figure 12:
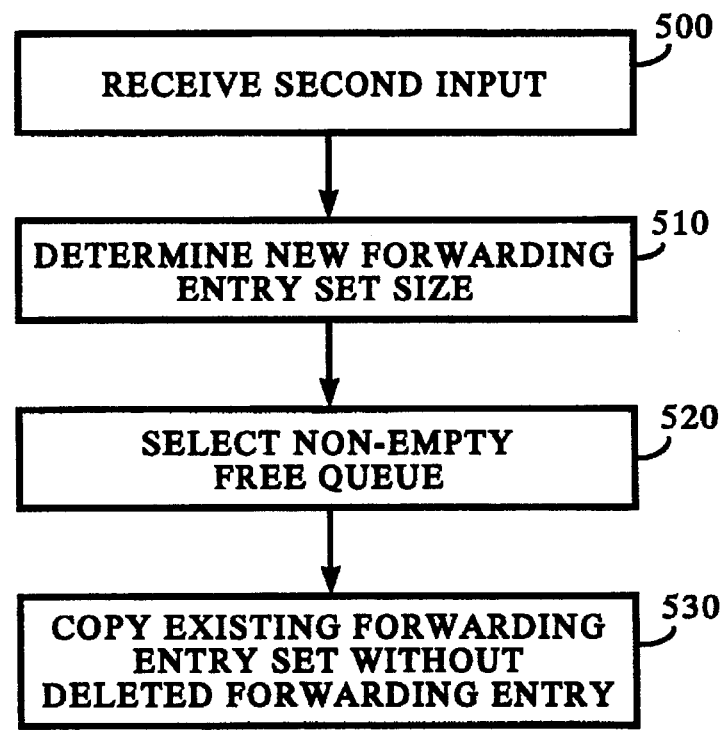
FIG. 12 is a flow chart showing the steps of a method for deleting forwarding information from a forwarding table.

In step 430, a new forwarding entry set containing the forwarding entries from said existing forwarding entry set, as well as a forwarding entry containing the forwarding information contained in the input, is written to a free space segment pointed to by a queue element in the selected non-empty free queue. FIG. 12 shows a method for deleting forwarding information from a forwarding table. In step 500 a second input, containing a station address, is received. In step 510 a new forwarding entry set size is determined. Step 510 includes the activities of locating an existing forwarding entry set containing forwarding entries for station addresses related to the station address contained in the second input and calculating the new forwarding entry size equal to the size of the existing forwarding entry set, minus the size of one forwarding entry.

In step 520 a non-empty free queue containing at least one queue element pointing to a free space segment in the forwarding table of size greater than or equal to said new forwarding entry set size. In step 530 the existing forwarding entry set, without the forwarding entry having forwarding information for said station address contained in said second input, is copied to one of the free space segments indicated by a queue element in the non-empty free queue.

It is to be understood that the invention is not necessarily limited to the particular embodiment shown herein. The invention may be adapted to a wide variety of information management systems. It is also to be understood that various adaptations and modifications may be made within the spirit and scope of the invention.

What is claimed is:

1. In apparatus for maintaining frame forwarding information in a bridge or a router, comprising:

a forwarding table having zero or more forwarding entry sets of different sizes, and zero or more free space segments, each said free space segment having a size;

a hash table having a plurality of hash table entries, each one of said plurality of hash table entries pointing to one of said one or more forwarding entry sets of different sizes, each one of said plurality of hash table entries containing the size of said one of said one or more forwarding entry sets;

a plurality of free queues, each one of said plurality of free queues having an associated free space segment size, and zero or more queue elements indicating those of said free space segments having said size equal to said associated free space segment size; and a forwarding entry adding process, responsive to an input, said input containing an address and forwarding information, for determining a new forwarding entry set size, said new forwarding entry set size equal to a size of a forwarding entry plus a size contained in one of said plurality of hash table entries, said one of said plurality of hash table entries indexed by a value of a hash index field of an output of a hash function applied to said address contained in said input, and for selecting a non-empty free queue having associated free space segment size greater than or equal to said new forwarding entry get size, and for writing a new forwarding entry set to one of said free space segments indicated by a queue element from said non-empty free queue, said new forwarding entry set having a forwarding entry containing said forwarding information contained in said input.

2. The apparatus of claim 1 wherein an index into said hash table for a given hash table entry is equal to a hash index field of the output of a hash function applied to a given address, said given hash table entry pointing to a forwarding entry set having a forwarding entry containing forwarding information for received frames containing said given address.

3. The apparatus of claim 2 one of said forwarding entries in said forwarding entry set having a field equal to a remainder field of the hash output of said hash function applied to said given address, and a second field containing forwarding information for received frames containing said address.

4. The apparatus of claim 3, further comprising:

a plurality of communications segments;

frame receiving means, responsive to said communications segments, for receiving a frame from one of said plurality of communications segments;

frame forwarding means, responsive to said frame receiving means, said hash table and said forwarding table, for forwarding said frame based on the contents of said frame and forwarding information in said forwarding table.

5. The apparatus of claim 4 further comprising a mutual exclusion circuit, coupled with said frame forwarding means, said microprocessor, and said memory, for preventing said frame forwarding means from reading said hash table during a write operation by said forwarding entry adding process.

6. The apparatus of claim 5 further comprising a learning means, responsive to said frame receiving means receiving a frame, for generating said input when no forwarding entry exists in said forwarding entry table having forwarding information for a station address contained in a source address field of said received frame.

7. The apparatus of claim 6 wherein said address contained in said input generated by said learning means is equal to a station address contained in a source address field of said received frame, and the forwarding information indicates to forward frames with a destination address equal to said station address to the LAN segment said frame is received from.

8. The apparatus of claim 5 further comprising a forwarding entry deleting means, responsive to a second input, said second input containing a station address, for determining a new forwarding entry set size equal to the size of the existing forwarding entry set for station addresses related to said station address contained in said second input minus the size of one forwarding entry, selecting a non-empty free queue having associated free space segment size greater than or equal to said new forwarding entry set size, and copying said existing forwarding entry set, without the forwarding entry having forwarding information for said station address contained in said second input, to one of said free space segments indicated by a queue element from said non-empty free queue.

9. The apparatus as in claim 8, further comprising:

a timer;

an aging process, responsive to said frame receiving means, said timer and said forwarding table for generating said second input when no frame is received containing destination or source address field contents equal to a given station address, said address contained in said second input equal to said given station address.

10. A method for adding forwarding information to a forwarding table, comprising the steps of:

receiving an input, said input containing a station address and forwarding information;

determining a size of an existing forwarding entry set having forwarding entries for station addresses related to said station address contained in said input, said size of said existing forwarding entry set contained in a hash table entry within a hash table, said hash table entry within said hash table indexed by a value of a hash index field of an output of a hash function applied to said station address contained in said input;

determining a new forwarding entry set size equal to said size of said existing forwarding entry set having forwarding entries for station addresses related to said station address contained in said input plus the size of one forwarding entry;

selecting a non-empty free queue from a plurality of free queues, said non-empty free queue having one or more elements pointing to free space segments in said forwarding table, said free space segments being of size equal to or greater than said new forwarding entry set size; and writing a new forwarding entry set to one of said free space segments pointed to by one of said one or more queue elements in said non-empty free queue, said new forwarding entry set containing the forwarding entries from said existing forwarding entry set, as well as a forwarding entry containing said forwarding information contained in said input.

11. A method for deleting forwarding information from a forwarding table, comprising the steps of:

receiving an input, said input containing a station address;

determining a size of an existing forwarding entry set having forwarding entries for station addresses related to said station address contained in said input, said size of said existing forwarding entry set contained in a hash table entry within a hash table, said hash table entry within said hash table having indexed by a value of a hash index field of an output of a hash function applied to said station address contained in said input;

determining a new forwarding entry set size equal to said size of said existing forwarding entry set having forwarding entries for station addresses related to said station address contained in said input minus the size of one forwarding entry;

selecting a non-empty free queue having associated free space segment size greater than or equal to said new forwarding entry set size; and copying said existing forwarding entry set, without the forwarding entry having forwarding information for said station address contained in said second input, to one of said free space segments indicated by a queue element from said non-empty free queue.

* * * * *